UNITED STATES PATENT OFFICE.

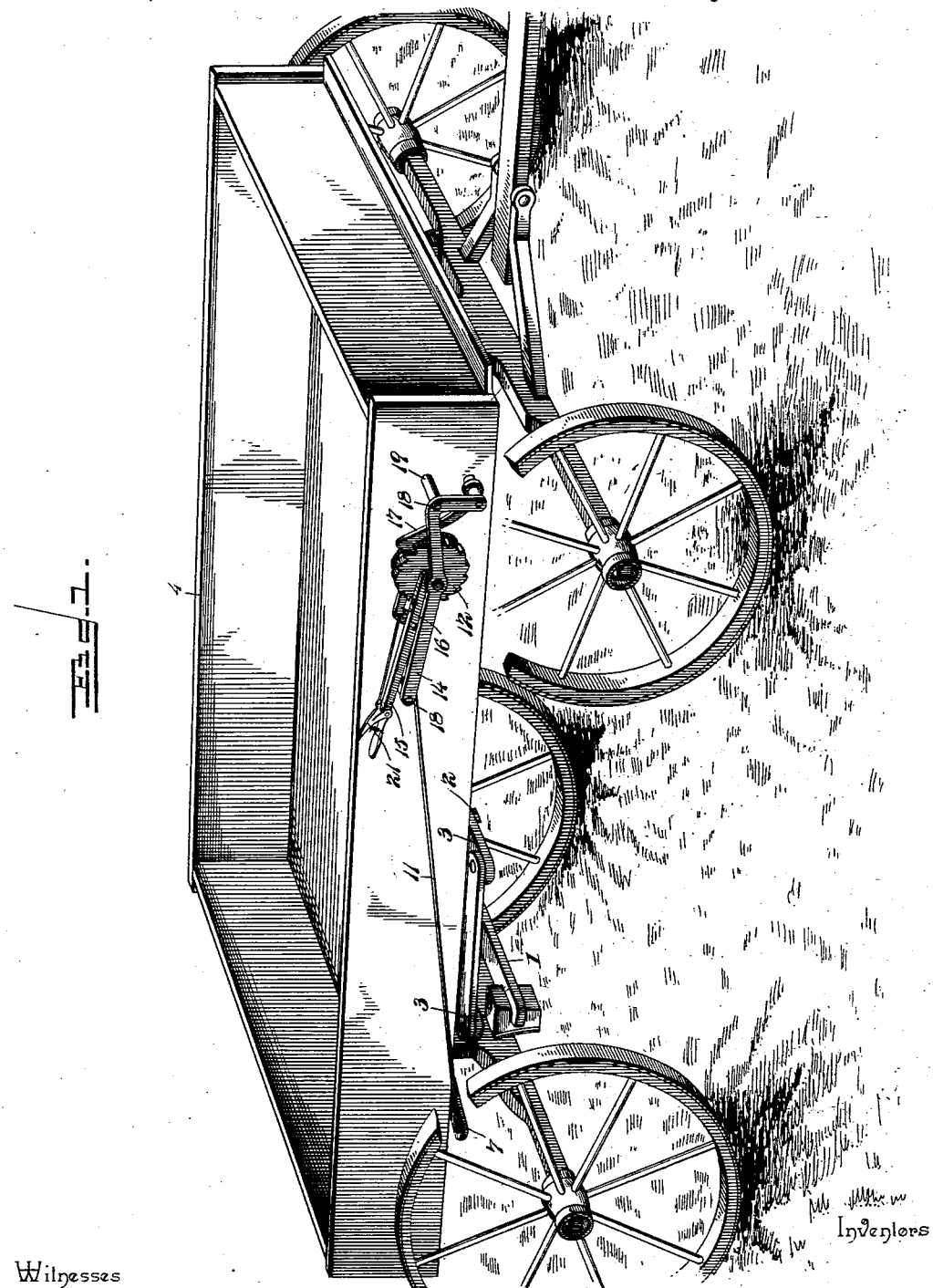

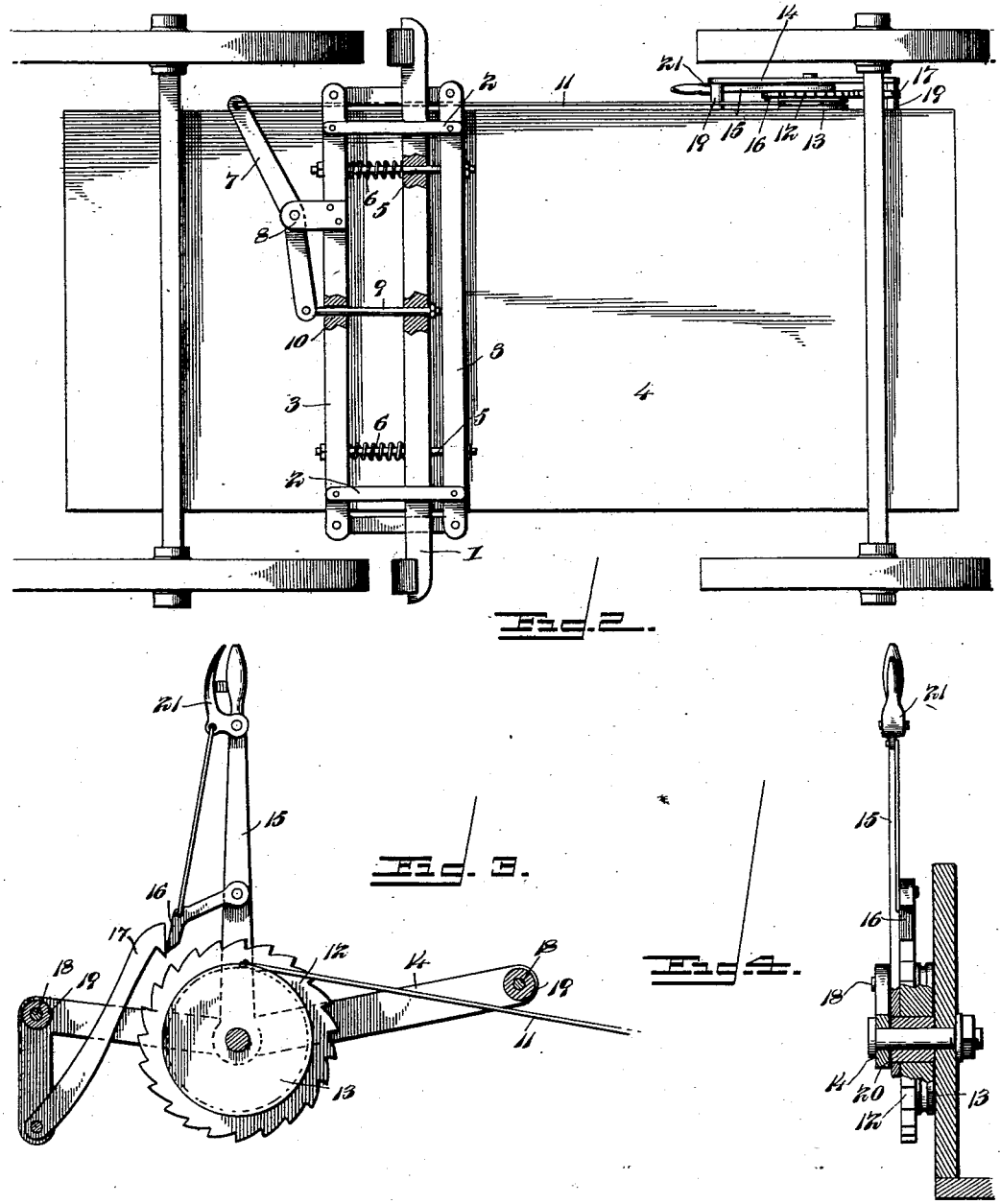

JAMES E. WALTON AND JOHN G. WALTON, OF SHIRLEY, MISSOURI.

VEHICLE-BRAKE.

SPECIFICATION forming part of Letters Patent No. 564,669, dated July 28, 1896.

Application filed March 20, 1896. Serial No. 584,151. (No model.)

*To all whom it may concern:*

Be it known that we, JAMES E. WALTON and JOHN G. WALTON, citizens of the United States, residing at Shirley, in the county of Washington and State of Missouri, have invented a new and useful Vehicle-Brake, of which the following is a specification.

The invention relates to improvements in vehicle-brakes.

The object of the present invention is to improve the construction of vehicle-brakes and to provide a simple, inexpensive, and efficient one adapted to be readily applied to wagons and other vehicles, and capable of causing the brake-shoes to engage the wheels firmly and positively, even after they become worn and reduced in size.

A further object of the invention is to provide a brake which will not require any readjustment of the parts to take up the wear of the brake-shoes, but which will enable the same to be carried into contact with the wheels whether they be new or old.

The invention consists in the construction and novel combination and arrangement of parts hereinafter fully described, illustrated in the accompanying drawings, and pointed out in the claims hereto appended.

In the drawings, Figure 1 is a perspective view of a brake constructed in accordance with this invention and shown applied to a vehicle. Fig. 2 is a reverse plan view. Fig. 3 is a vertical sectional view showing the check-pawl held out of engagement with the ratchet-wheel to relieve the wheels of the brake-shoes. Fig. 4 is a transverse sectional view illustrating the manner of mounting the ratchet-wheel and the drum or pulley thereof.

Like numerals of reference designate corresponding parts in all the figures of the drawings.

1 designates a sliding brake-beam mounted in suitable ways formed by longitudinally-disposed bars or strips 2, connecting transverse cleats 3 of a wagon-body 4, and the transverse cleats are also connected by a pair of guide-rods 5, on which the brake bar or beam slides, the brake bar or beam being provided with perforations to receive the guide-rods. The brake bar or beam is normally held off the wheels by spiral springs 6, disposed on the rear portions of the guide-rods and interposed between the rear cleat 3 and the sliding brake bar or beam, and the springs are also adapted to throw the brake-shoes off the wheels when the brake is unlocked.

A transversely-disposed brake-lever 7 is fulcrumed intermediate of its ends to a suitable support 8 of the wagon-body. Its inner end is connected with the sliding brake bar or beam by a rod 9, which passes through a perforation 10 of the rear transverse cleat, and which has its ends suitably secured to the lever and to the brake beam or bar in suitable perforations thereof; and the outer end of the brake-lever is secured to the rear end of a longitudinally-disposed cable 11, which is arranged at one side of the wagon-body and which extends forward to the brake-operating mechanism.

The brake-operating mechanism comprises a ratchet-wheel 12, provided with a drum or pulley 13 and arranged in a supporting-frame 14, an operating-lever 15, provided with an actuating pawl or detent 16, and a check-pawl 17, arranged to engage the ratchet-wheel and adapted to lock the same against retrograde rotation. The supporting-frame is substantially L-shaped, extending longitudinally of the wagon-body and offset therefrom by means of suitable fastening devices 18 and spacing-sleeves 19, and its central fastening device receives a sleeve or bushing 20, on which the ratchet-wheel is journaled.

The check-pawl is pivoted at its lower end to the front of the frame, at the lower end thereof, by an adjacent fastening device. It extends upward and rearward, and it is provided at its upper end with a tooth engaging the teeth of the ratchet-wheel to prevent the cable, which is attached to and adapted to be wound around the pulley or drum, from unwinding. The pulley or drum is grooved at its periphery for the reception of the front portion of the cable, and the latter may be attached to it in any suitable manner.

The operating-lever is fulcrumed at its lower end to the central fastening device, which carries the ratchet-wheel. The actuating-pawl is pivotally mounted on and carried by the operating-lever and depends therefrom at the front side thereof, being located immediately above the ratchet-wheel, and when the operating-lever swings rearward the actuating-pawl rides over the ratchet-teeth and the forward swing of the operating-lever causes the actuating-pawl to engage the ratchet-wheel and carry the same forward. The operating-lever may be readily oscillated any desired number of times to carry the brake-shoes firmly into engagement with the hind wheels of the vehicle, and as the brake-shoes become worn the operating mechanism will apply the brake a trifle more to take up the wear and to cause the brake-shoes to engage the hind wheels as positively as they could before being worn.

The actuating-pawl is connected by a link-rod or the like with a spring-actuated latch-lever 21, arranged adjacent to the handle of the operating-lever and adapted to be readily grasped by the operator, and when it is desired to release the brake the latch-lever and the handle of the operating-lever are grasped and the actuating-pawl lifted sufficiently to clear the ratchet-wheel, and it is carried forward until it contacts with the check-pawl and lifts the same out of engagement with the ratchet-wheel. The springs 6 will then operate to throw the brake-shoes off of the wheels.

It will be seen that the vehicle-brake is simple and comparatively inexpensive in construction, that it is adapted to be readily applied to vehicles, and that it is capable of effectually engaging the brake-shoes with the vehicle-wheels and of taking up wear.

Changes in the form, proportion, and minor details of construction may be resorted to without departing from the spirit or sacrificing any of the advantages of this invention.

What we claim is—

1. The combination with a wagon-body, of parallel transverse cleats secured to the lower face thereof, longitudinal strips connecting the cleats, arranged on the lower faces thereof and forming a way, the longitudinally-disposed guide-rods located at opposite sides of the body and having their terminals secured to the cleats, a sliding brake-bar arranged between the cleats in said way, and provided with perforations receiving the guide-rods, spiral springs disposed on the guide-rods and interposed between the rear edge of the brake-bar and the rear cleat, a centrally-arranged rearwardly-extending rod 9 secured at its front end to the brake-bar and passing through a perforation of the rear cleat, the transversely-disposed brake-lever located at one side of the wagon-body on the bottom thereof, fulcrumed intermediate of its ends and having its inner ends connected with the rear end of the rod 9, and operating mechanism connected with the outer end of the brake-lever, substantially as described.

2. In a vehicle-brake, the combination with a wagon-body, of a vertical supporting-frame mounted on one side thereof, a ratchet-wheel journaled in the supporting-frame and provided with a drum, brake mechanism, a cable adapted to be wound on the drum and connected with the brake mechanism, a rearwardly-inclined check-pawl located in advance of the ratchet-wheel, having its upper end engaging the same and pivoted at its lower end, an oscillating operating-lever, an actuating-pawl located above the ratchet-wheel, pivoted at its upper end to the operating-lever and extending downward and forward therefrom and engaging the ratchet-wheel at its lower end, and a handle or latch-lever mounted on the operating-lever at the handle thereof in convenient position to be grasped by the operator and connected with the actuating-pawl and adapted to swing the latter upward, whereby the same is capable of lifting the check-pawl out of engagement with the ratchet-wheel, substantially as described.

In testimony that we claim the foregoing as our own we have hereto affixed our signatures in the presence of two witnesses.

JAMES E. WALTON.
JOHN G. WALTON.

Witnesses:
F. J. FLYNN,
W. M. BENNETT.